United States Patent [19]

Barkey et al.

[11] Patent Number: 5,825,748
[45] Date of Patent: Oct. 20, 1998

[54] CREDIT-BASED FLOW CONTROL CHECKING AND CORRECTION SYSTEM

[75] Inventors: Kathy Sue Barkey, Kingston; Carl Alfred Bender, Highland; Derrick LeRoy Garmire, Kingston, all of N.Y.; Harold Edgar Roman, Danville, N.H.; Daniel Gerard Smyth, Austin, Tex.

[73] Assignee: International Business Machines Corporation, Armonk, N.Y.

[21] Appl. No.: 833,636

[22] Filed: Apr. 8, 1997

[51] Int. Cl.$^6$ .................................................. H04L 12/56
[52] U.S. Cl. .......................................... 370/236; 370/395
[58] Field of Search .................................. 370/229–237, 370/395, 412, 414, 415, 416, 417, 118, 235, 236; 395/200.62, 200.63, 200.65

[56] References Cited

U.S. PATENT DOCUMENTS

| | | | |
|---|---|---|---|
| 4,475,192 | 10/1984 | Fernow et al. | 370/232 |
| 5,029,164 | 7/1991 | Goldstein et al. | 370/235 |
| 5,040,176 | 8/1991 | Barzilai et al. | 370/422 |
| 5,063,562 | 11/1991 | Barzilai et al. | 370/231 |
| 5,084,816 | 1/1992 | Boese et al. | 395/181.02 |
| 5,201,044 | 4/1993 | Frey, Jr. et al. | 395/182.18 |
| 5,381,407 | 1/1995 | Chao | 370/233 |
| 5,392,280 | 2/1995 | Zheng | 370/353 |
| 5,453,982 | 9/1995 | Pennington et al. | 370/235 |
| 5,483,526 | 1/1996 | Ben-Nun et al. | 370/395 |
| 5,490,251 | 2/1996 | Clark et al. | 395/200.67 |
| 5,511,076 | 4/1996 | Ramakrishnan et al. | 370/423 |
| 5,515,359 | 5/1996 | Zheng | 370/231 |
| 5,515,373 | 5/1996 | Lynch et al. | 370/465 |
| 5,528,591 | 6/1996 | Lauer | 370/231 |
| 5,581,566 | 12/1996 | St. John et al. | 371/37.6 |
| 5,610,745 | 3/1997 | Bennet | 370/232 |
| 5,633,867 | 5/1997 | Ben-Nun et al. | 370/399 |
| 5,710,942 | 1/1998 | Nakagaki et al. | 395/872 |

OTHER PUBLICATIONS

"Fast Transaction Processing Interface", IBM Technical Disclosure Bulletin, vol. 33, No. 9, Feb. 1991, pp. 263–265.
Anderson, Jr., H. et al., "Flow–Balancing Congestion Control for Computer Networks", IBM Technical Disclosure Bulletin, vol. 25, No. 1, Jun. 1982, pp. 174–178.
"Simple Method to Integrate X.25 Packets with SNA Messages on the Same Link", IBM Technical Disclosure Bulletin, vol. 30, No. 11, Apr. 1988, pp. 299–300.

*Primary Examiner*—Chau Nguyen
*Assistant Examiner*—Kenneth Vanderpuye
*Attorney, Agent, or Firm*—Heslin & Rothenberg, P.C.

[57] ABSTRACT

A credit-based flow control checking scheme is presented for controlling data communications in a closed loop system comprising a sender, a receiver and a link coupling the sender and receiver. The credit-based scheme includes automatically periodically transmitting a credit query from the receiver to the sender and upon return receipt of a credit acknowledge containing the available credit count maintained by the sender, determining whether credit gain or credit loss has occurred subsequent to initialization of the closed loop system. Along with automatically determining whether credit gain or credit loss has occurred, a method/system is presented for automatically correcting the loss or gain without requiring resetting of the closed loop system.

10 Claims, 5 Drawing Sheets

5,825,748

CREDIT-BASED FLOW CONTROL CHECKING AND CORRECTION SYSTEM

TECHNICAL FIELD

This invention relates to traffic control in a digital communication network, and more particularly, to a method/system for dynamically controlling data transmission in a credit-based system to minimize data loss and performance degradation.

BACKGROUND OF THE INVENTION

With transmission of data over a digital communication network, such as an asynchronous transfer mode or ATM network, problems arise when multiple sources send data cells or packets at widely varying rates through a switch node or link of the network at an aggregated rate which taxes the ability of the switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for a long period of time, the buffer storage will be filled to maximum capacity and any additional data must be discarded.

In an effort to minimize such data loss, different types of flow control systems have been proposed. One such system is a rate-based system in which the rate at which the data is permitted to enter the network is adjusted via a feedback signal from a network reflecting the congestion of the network. This congestion of the network is typically denoted by an explicit forward congestion indication bit or an explicit rate in the form of resource management cells fed back to the source node.

Another system for controlling data transmission employs a credit-based control approach which provides lossless transmission of data cells. Credits are generated starting at a destination node to reflect its ability to receive data. In an end-to-end implementation, this credit is transmitted back to the next upstream node where the credit is interpreted and modified based on that node's ability to receive data. The process continues through each intermediate node back to the source, where the credit at the source reflects all intermediate credits as well as the one from the destination. Typically, the credits reflect the unused buffer space at each node. The source then interprets the credit as an indication of the amount of data that it can transmit into the network without any data loss due to congestion or buffer overflow. Note that data rate is not controlled, but the number of cells transmitted is controlled.

A variation on the end-to-end credit-based approach is a link-to-link implementation wherein adjacent nodes in a switch network, for example, interact to control the flow of data from one node, a sender, to another node, the receiver. The sender supplies data segments for forwarding to the receiver, and the receiver has a finite data receive buffer into which received data segments from the sender are placed. The emptying of the data receive buffer is controlled by a buffer read signal from a downstream entity. In an ideal uncongested communication fabric, each segment of data could be read from the data receive buffer the cycle after it is written therein from the sender. In such a case, the data receive buffer would never contain more than one data segment. When congestion causes the downstream entity to slow its rate of buffer reads below one per cycle, data segments will accumulate in the receive buffer. This reduces the space available for storing future data segments from the sender.

At the time the link is established, the sender is allocated a number of credits. Each credit represents permission to transmit one data segment over the data link to the receiver. Besides the data link, a separate credit link is employed by the receiver to provide the sender with additional credits. Because the credit link is separate from the data link, the transfer of credits has no effect on the data bandwidth. The sender increments a credit counter upon receipt of a credit and decrements the credit counter when a data segment is placed on the data link for transmission to the receiver.

The flow control method described above works perfectly in an error free link. The sender is never starved for credits unnecessarily and the receiver buffer is never overrun. However, single bit errors in either the data or credit link may introduce errors in the flow control mechanism which may result in performance degradation or overrun of the receive buffer. If the receive buffer is overrun, data segments will be lost. Conventionally, any error detected on the data from the sender to the receiver causes the link to stop running (fault) and be reset to a known state. Similarly, in prior systems if the credits flowing from the receiver to the sender have invalid code points, and if any of these are detected, the link would fault and be reset to a known state. Thus, the conventional error correction approach is not tolerant of occasional faults in the network, even if the faults comprise errors in credits transmitted from the receiver back to the sender.

Since prior credit-based flow control mechanisms are fault intolerant, there is a need for a tolerant credit-based flow control checking scheme and accompanying correction mechanism to maintain individual links in a system operating optimally.

DISCLOSURE OF THE INVENTION

Briefly summarized, this invention comprises in one aspect a credit-based method for controlling data communications in a closed loop system comprising a sender and a receiver coupled by a link. The method comprises: allocating a specified number of credits to the sender in an available credit count, a credit manifesting a portion of memory space in the receiver reserved to store a data segment received from the sender; transmitting a data segment across the link from the sender to the receiver and decrementing the available credit count at the sender for the transmitted data segment; returning a credit from the receiver to the available credit count of the sender with each data segment received and consumed at the receiver; and automatically periodically checking the number of credits in the closed loop system to ascertain whether credit loss or credit gain has occurred, the credit loss or credit gain potentially affecting control of data communications within the closed loop system.

In another aspect, the invention comprises a credit-based data communications system which employs a specified number of credits to control flow of data. The system includes a sender having an available credit counter and a receiver having a receive data buffer. The sender and receiver are coupled together by a data link, which allows the sender to transmit data segments to the receiver's receive data buffer. Means are provided for sending a credit to the available credit counter of the sender upon consumption of a data segment at the receiver, a credit manifesting a portion of memory space in the receive data buffer reserved to store a data segment from the sender. The system also includes a mechanism for automatically periodically checking the number of credits in the system to ascertain whether credit loss or credit gain has occurred from the specified number of credits. As an enhancement, automatic control can be provided for correcting an ascertained credit loss or credit gain without resetting the system.

To restate, a credit-based flow control checking and correction scheme is presented where the total number of credits in the closed link system can be counted to an exact number, regardless of the electrical link between the sender and receiver. Further, the number of preallocated credits in the closed system can be selected to accommodate different conditions on different links, for example, different physical link connections. Credit checking pursuant to this invention is non-intrusive since it does not interfere with normal credit and data transmission on the link. Tolerance in correction of credit error can occur without requiring resetting of the link with its commensurate disruption of communications. Further, there is minimum bandwidth interference because the credit query code is transmitted only during null (idle) times on the credit link. The method could also be enhanced by changing the sender design so that the credit acknowledge code is also only sent during null times.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
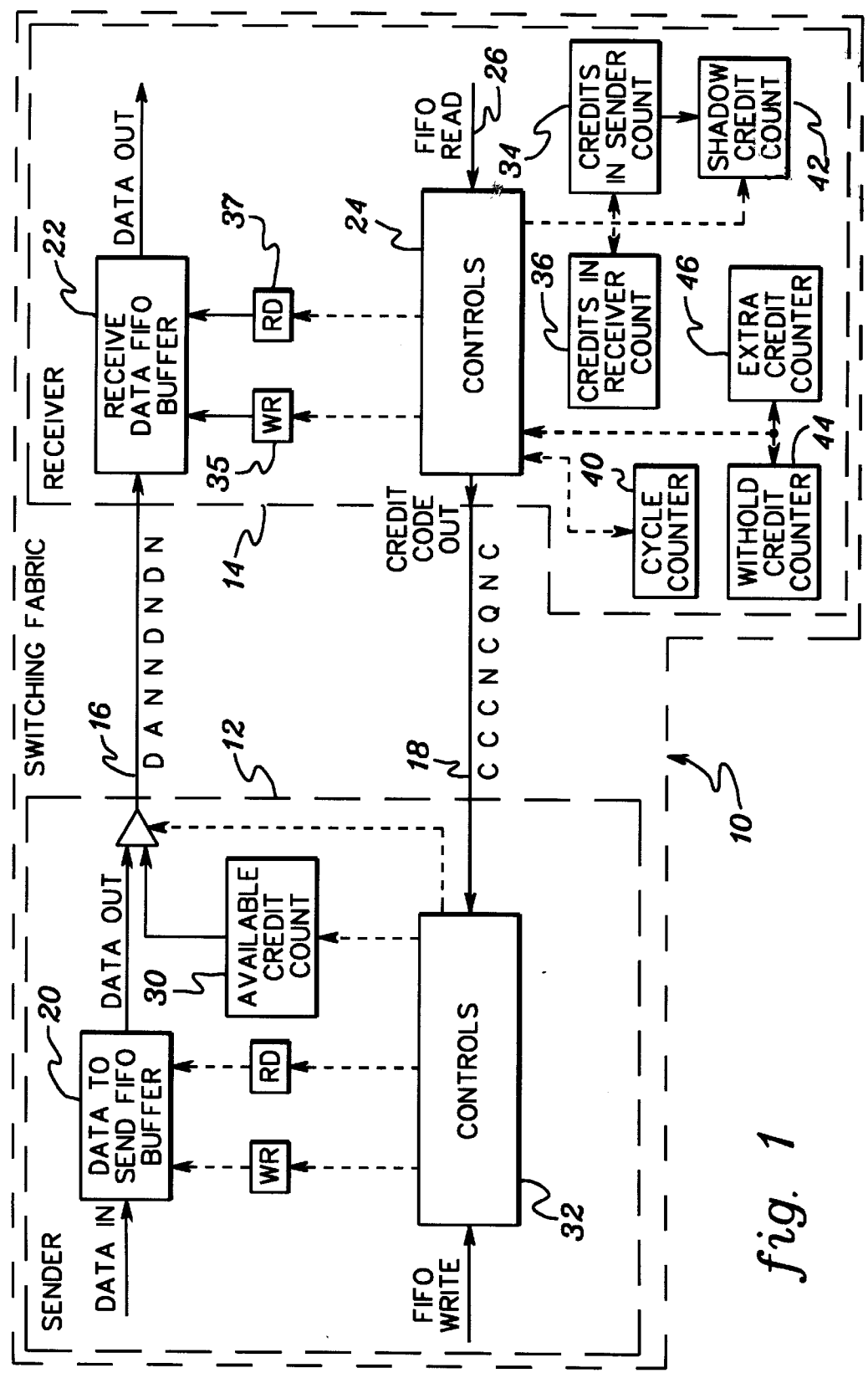
FIG. 1 is a schematic diagram of a closed loop system in accordance with the present invention wherein a sender and receiver are coupled by a data link and a credit link.

By way of example, FIG. 1 depicts one embodiment of components of a communication link within a switching fabric 10 using credit-based flow control and credit checking in accordance with the present invention. Switching fabric 10 would typically include a large number of such communication links. Each communication link includes a sender 12 and a receiver 14 coupled by a data link 16 and a credit link 18. Sender 12 has a supply of data segments or units (D) to be forwarded to receiver 14. A data segment is defined as an amount of data that can be transferred onto the data link in one cycle. For example, a data segment might today comprise two bytes of data. If no data segment is sent to receiver 14 in a given cycle, a null (N) appears on the data link. The data segments are supplied by an upstream entity (not shown) and held in a data to send first-in first-out (FIFO) buffer 20. The size of buffer 20 is unimportant.

Receiver 14 has a finite data receive FIFO buffer 22 into which data segments received across data link 16 from sender 12 are placed. The emptying or consuming of data segments from receive data FIFO buffer 22 is controlled by control logic 24 in response to a FIFO read signal 26 received from a downstream entity (not shown). In an ideal uncongested communication fabric, each segment of data (D) would be read from receive data FIFO buffer 22 the cycle after the data is written therein. Thus, buffer 22 ideally would contain no more than one data segment. However, when congestion causes the downstream entity to slow its rate of FIFO reads below one per cycle, data segments can accumulate in the receive data FIFO buffer. This in turn reduces the available space for storing future data segments from sender 12. The goal of credit-based flow control is to insure that data segments (D) are sent to receiver 14 at a rate which will not cause overflowing of receive data FIFO buffer 22, while at the same time maximizing utilization of the physical link coupling sender 12 and receiver 14.

At the time the communication link is established or initialized, sender 12 is allocated a number of credits, n, which are stored in an available credit counter (ACC) 30. Each credit represents permission to transmit one segment of data over data link 16. Credit link 18 is used by receiver 14 as described herein below to provide sender 12 with additional credits. These additional credits flow through control logic 32 to available credit counter 30. Because the credit link is separate from the data link, transfer of credits from receiver 14 to sender 12 has no affect on data bandwidth. Sender 12 increments ACC 30 upon receipt of a credit from receiver 14 and decrements ACC 30 when a data segment (D) is placed on data link 16 for transmission to the receiver.

Receiver 14 maintains a credit count in a credits in sender (CIS) counter 34 which is also set to n at the time of establishment of the communication link. Counter 34 is decremented when a data segment is received (FIFO write (WR) 35) and incremented when a credit is sent to sender 12 from receiver 14 in response to consuming of a data segment (FIFO read (RD) 37). A credits in receiver (CIR) counter 36 maintains a count representative of data segments stored in receive data FIFO buffer 22 which has not been read out yet. CIR counter 36 is incremented when a data segment is received (FIFO write 35) and decremented when a credit is sent (FIFO read 37). In an ideal uncongested link, CIS counter 34 should equal n−1, CIR counter should equal one, and the FIFO buffer will be empty except for one data segment. As downstream congestion, however, causes FIFO buffer 22 to fill, CIS counter 34 will decrease and CIR counter 36 will increase, and their sum will remain equal to n.

The value of n is chosen for a given embodiment based on the round trip travel time of data segments and returning credit codes through the communication link. The value is used both as the initial value of ACC 30 & CIS 34 counters, and as the maximum memory size in data segments of the receive data FIFO buffer 22. The chosen value n thus guarantees that if the sender expends all credits and the receiver FIFO buffer is never read, the sender will have sent just enough data to fill FIFO buffer 22, but not enough to overflow it. Otherwise, data segments would be lost.

Conversely, if the receive FIFO buffer is flowing freely and each data segment is read the cycle after being written, the resulting credit must arrive at sender 12 before the available credit count 30 goes to zero forcing the sender to waste one or more cycles sending a null code (N) on data link 16, thereby degrading performance. The equation used to calculate n is:

n=number of data segments in flight+number of credits in flight+ number of cycles for sender to increment ACC on receipt of credit+number of cycles for receiver to send credit after receipt of data segment. (1)

In one preferred implementation, the data and credit links are carried over the same physical cable, and therefore, the first two terms of equation (1) are equal. The link is comprised of the cable itself plus board wiring on both the receiver and sender. An assumption is made that the board wiring is also of equal length in both the sender and receiver. This expands the first two terms to:

number of data segments (credits) in flight=(cable length×cable delay/unit length)/cycle time+(board wire length×board wire delay/unit length)/cycle time (2)

In a system of many links, n may be chosen to meet this equation for the longest possible link. Shorter links will have more credits than their closed loops require, but this will not adversely affect performance. Table I provides an example of a system with a small n. In this example, time of flight is assumed to comprise two cycles, receiver delay is three cycles, sender delay is two cycles, and n is defined as:

$n$=2×(time of flight)+(receiver delay)+(sender delay)=9.

Also, in Table I, "DIT" defines the number of data segments in transit, while "CIT" represents the number of credits in transit.

TABLE I

|  | ACC | DIT | CIS | CIR | CIT |
|---|---|---|---|---|---|
| Initial State (FIFO empty) | 9 | 0 | 9 | 0 | 0 |
| 1st data segment leaves sender | 8 | 1 | 9 | 0 | 0 |
| 2nd data segment leaves sender | 7 | 2 | 9 | 0 | 0 |
| 3rd data segment leaves sender | 6 | 2 | 9 | 0 | 0 |
| 1st FIFO write | 5 | 2 | 8 | 1 | 0 |
| 2nd FIFO write, 1st FIFO read | 4 | 2 | 8 | 1 | 1 |
| 3rd FIFO write, 2nd FIFO read | 3 | 2 | 8 | 1 | 2 |
| 4th FIFO write, 3rd FIFO read | 2 | 2 | 8 | 1 | 2 |
| 1st credit processed | 2 | 2 | 8 | 1 | 2 |
| steady data, no congestion | 2 | 2 | 8 | 1 | 2 |
| congestion begins | — | — | — | — | — |
| FIFO write, no read | 2 | 2 | 7 | 2 | 1 |
| FIFO write, no read | 2 | 2 | 6 | 3 | 0 |
| FIFO write, no read | 2 | 2 | 5 | 4 | 0 |
| Last credit processed | 2 | 2 | 4 | 5 | 0 |
| Last data sent | 1 | 2 | 3 | 6 | 0 |
|  | 0 | 1 | 2 | 7 | 0 |
|  | 0 | 0 | 1 | 8 | 0 |
| Last FIFO write (FIFO full) | 0 | 0 | 0 | 9 | 0 |
| steady state, FIFO full | 0 | 0 | 0 | 9 | 0 |
| congestion eases | — | — | — | — | — |
| 1st FIFO read | 0 | 0 | 1 | 8 | 1 |
| 2nd FIFO read | 0 | 0 | 2 | 7 | 2 |
| 3rd FIFO read | 0 | 0 | 3 | 6 | 2 |
| 1st credit processed | 1 | 0 | 4 | 5 | 2 |
| 1st data sent | 1 | 1 | 5 | 4 | 2 |
|  | 1 | 2 | 6 | 3 | 2 |
|  | 1 | 2 | 7 | 2 | 2 |
| 1st FIFO write | 1 | 2 | 7 | 2 | 2 |
| steady state | 1 | 2 | 7 | 2 | 2 |

As noted initially, credit-based flow control works well in an error free communication link. The sender is never starved for credits unnecessarily and the receiver FIFO buffer is never overrun. However, single bit errors in either the data or credit link may introduce errors in the flow control mechanism which could over time result in performance degradation or loss of data. The present invention is directed to addressing this problem.

As one detailed example, a data segment on data link 16 could consist of eighteen data bits and two tag bits. The tag values might be:

00 null segment
01 control segment
10 control segment
11 data segment

For purposes of flow control, some control segments are treated as data segments (i.e., require a credit) and others are not. Therefore, for this example, assume that all tag values other than 00 require a credit.

There are two possible errors on a data link, namely, gain of a data segment or loss of a data segment. Gain of a data segment occurs when tag bits 00 are seen by the receiver as 01, 10, or 11, while loss of a data segment occurs when tag bits 01, 10, or 11 are seen by the receiver as 00. In the case of gain of a data segment, the receiver will decrement CIS counter 36 for a segment that did not cause the sender to decrement the available credit count 30. This will cause the available credit count to be one above the allocated value, possibly resulting in an overrun of receive data FIFO buffer 22. If such an error continues to occur, there may be multiple extra credits in the system and as the extra credits accumulate, the probability of a receive FIFO buffer overrun increases.

In the case of loss of a data segment, the receiver fails to decrement the CIS counter 34 for a data segment that has caused a decrement to ACC 30 in sender 12. Thus, the receiver would not write this data segment into the FIFO buffer and therefore will never read it from the buffer and send a credit to replace the credit expended by the sender when the data segment is transmitted. The loss of credit will persist in the system, with CIS count 34 remaining one higher than it should be. This means the FIFO buffer can never fill completely, but only to n−1, and the sender will be prevented from sending the nth data segment if n−1 is reached. Subsequent errors of the same type can result in additional lost credits, potentially causing performance of the link to appreciably degrade.

Credit codes in credit link 18 also consist of two bits. These values might be defined as:

00 null
01 credit
10 null
11 credit query (Q)

The possible errors in the credit link are similar to those in the data link, namely, loss of credit or gain of credit. Loss of credit occurs when the 01 bit value is seen by the sender as 00, 10, or 11, while gain of credit occurs when bit code 00, 10, or 11 is seen by sender 12 as 01. The effect on the credit link of a loss of credit is analogous to that of loss of data. The sender will fail to increment ACC for this credit for which the receiver has already incremented the CIS counter 34. Thus, ACC 30 will remain one less than it should be, thereby resulting in degradation of performance as discussed above. Gain of a credit is analogous to gain of data. The ACC 30 will increment for a credit which the CIS counter 34 did not. Thus, ACC 30 will remain one credit higher than it should be, with the resultant risk of receive FIFO buffer 22 overrun. As with gain or loss of data, loss or gain of credit can be cumulative over time.

Described herein, therefore, is a credit checking method which comprises a means for detecting and correcting the conditions described above. The credit checking scheme of the present invention does not address the identification and correction of lost or extra data segments, but rather focuses on the number of credits in the communication link to ensure optimal flow control of information from the sender to the receiver. Correction of lost or extra data segments is assumed to be handled by a higher level, end-to-end protocol in the communication system, such as cyclic redundancy checking on data packets. The credit checking method presented herein operates separately on each communication link of the entire communication system.

As part of the credit checking mechanism, a new control segment on the data link and a new credit code on the credit link are introduced. The credit code "11", or credit query (CQ or Q), is used by receiver 14 to periodically request a "credit acknowledge" (CA or A) control segment from the sender. The credit query Q is sent in place of a null code N on credit link 18, thus the normal flow of credits is not interrupted. In one preferred implementation, the credit acknowledge A segment is sent immediately upon receipt of the credit query Q, potentially delaying a data segment by one cycle. This could optionally be modified to send the credit acknowledge in place of a null segment on data link 16, however, this may result in long credit query to credit acknowledge turnaround times in a busy data link. The credit query period or cycle is chosen to be large enough so that the occasional displacement of a data segment by a credit acknowledge has no appreciable affect on the performance of the link. The credit query Q is transmitted from receiver 14 to sender 12 upon a cycle counter 40 reaching a predefined count. Counter 40 would be reset with the transmission of each credit query Q from the receiver.

The contents of the credit acknowledge A data bits comprise the value of ACC 30 at the time the credit query is received. When this value is received at receiver 14, it is compared by control logic 24 to a "shadow credit count" (SCC) 42 which the receiver has been maintaining since sending the credit query Q. Shadow credit count 42 comprises the value of credits in sender count 34 at the time the credit query is sent less any credits for data segments received prior to return of the credit acknowledge. With receipt of each data segment, receiver 14 decrements the shadow credit count 42 until the credit acknowledge A is received. Thus, count 34 represents the number of credits not presently in receiver 14. If no loss or gain of data or credits has occurred, the value of ACC 30 contained within credit acknowledge A should equal the then present value of shadow credit count 42.

Preferably, the initially allocated credits n placed within ACC 30 is not the maximum number of data segments which can be held within receive data FIFO buffer 22, but rather some number plus an "acceptable credit gain" (ACG). ACG is a value that is chosen to define a reasonable number of credits gained (or data lost) to expect before the credit checking mechanism signals an error. Assuming that the receive buffer 22 size minus ACG is greater than or equal to n, the choice does not degrade the performance of the link. A similar "acceptable credit loss" (ACL) value is defined as the number of credit losses (or data gains) that can occur without serious performance degradation of the link.

If the credit checking mechanism detects greater than an acceptable loss or gain, the error state in the link is too high and corrective action must occur. In this case, the mechanism notifies higher level controls of the error. In one implementation, the mechanism may be configured to take action (reset or reinitialize the link) automatically, or to simply wait for instructions from higher level control.

If acceptable loss or gain is detected, the credit checking mechanism in accordance with the present invention may automatically correct the loss or gain without disruption of the communication link. This occurs through use of a withhold credit counter 44 and an extra credit counter 46. As explained further below, if credit gain which is less than the acceptable gain value is detected, withhold credit counter 44 is loaded with the value of the gain. Alternatively, if a loss is detected which is less than the acceptable loss, the loss is placed within an extra credit counter 46. Thus, credit gain can be corrected by withholding a credit from return to sender upon consumption of a data segment while at the same time decrementing withhold credit counter 44. Credit loss can be corrected by sending an extra credit when a data segment is not consumed at the receiver on a given cycle. Along with sending the extra credit, the extra credit counter 46 would be decremented. Using this procedure, the credit is corrected upon zeroing of the withhold credit counter or extra credit counter as appropriate.

Figure 2A:
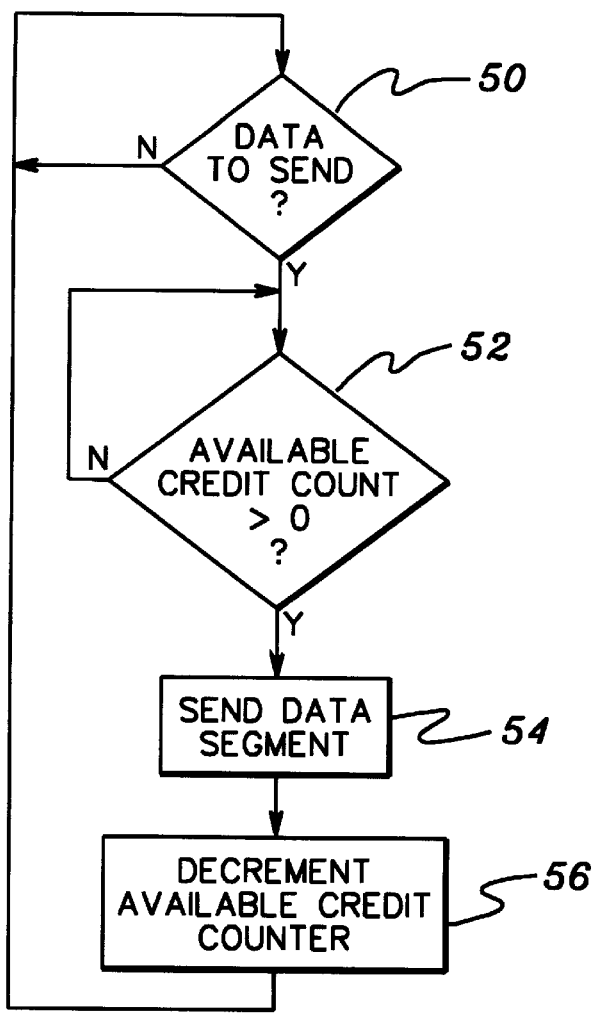
FIG. 2a is a flowchart of one embodiment of data flow control within the sender of FIG. 1.

Operation of the credit checking and correction scheme of the present invention is described further below with reference to the flowcharts of FIGS. 2a–6. FIG. 2a depicts one embodiment of data control logic within sender 12 of FIG. 1. Initially, sender control 32 determines whether a data segment is to be sent 50 from the data to send FIFO buffer. If "no", processing makes the same inquiry with the next cycle. If there is a data segment to be sent, then processing determines whether the available credit count is greater than zero 52, i.e., whether a credit is available to allow transmission of the data segment. If "no", processing waits until a credit becomes available (i.e., is received from the receiver (14) and placed in the available credit count (30) (see FIG. 1). Once a credit is available, then the data segment is sent 54 and the available credit counter is decremented 56. With the next cycle, processing returns to inquire whether there is another data segment to be sent.

Figure 2B:
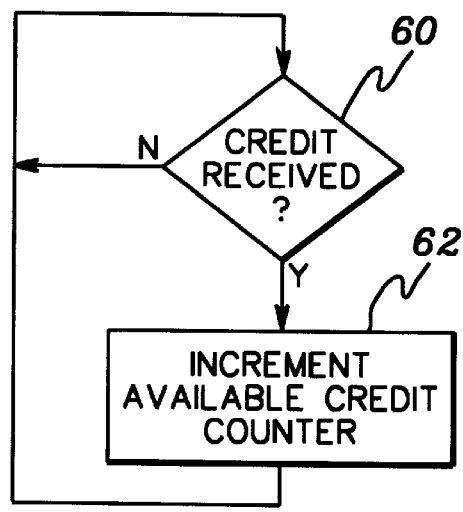
FIG. 2b is a flowchart of one embodiment of credit processing within the sender of FIG. 1.

FIG. 2b represents logic flow for credits within the sender. Credit processing waits until a credit is received 60 on the credit link and then increments the sender's available credit counter 62.

Figure 3A:
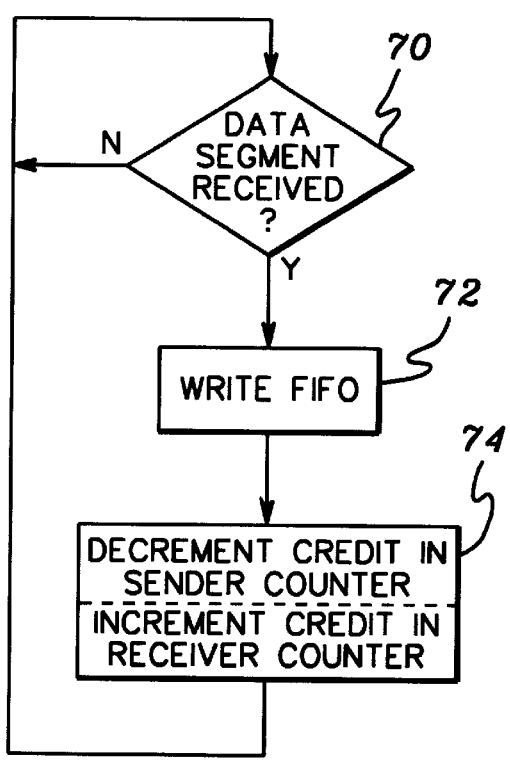
FIG. 3a is a flowchart of one embodiment of data processing within the receiver of FIG. 1.

FIG. 3a depicts data processing within the receiver. Processing waits for a data segment to be received 70 and upon receipt writes the data into the receive data FIFO buffer 72. Thereafter, the credit in sender (CIS) counter is decremented, and the credit in receiver (CIR) counter is incremented. Processing then returns to waiting for a next data segment 70.

Figure 3B:
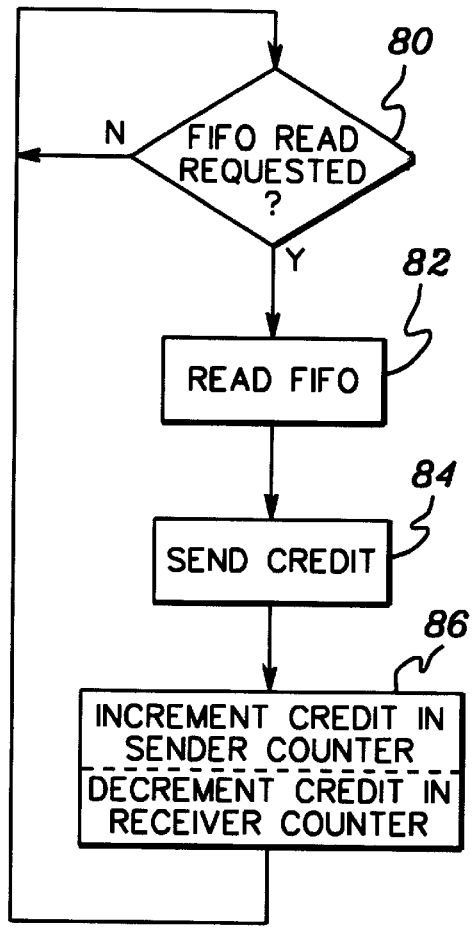
FIG. 3b is a flowchart of one embodiment of credit processing within the receiver of FIG. 1.

FIG. 3b represents credit processing logic within the receiver. This logic waits for a FIFO read (26) (FIG. 1) from a downstream entity 80, and when a read is received, a read FIFO command 82 is sent to retrieve a data segment from the receive data FIFO buffer. With reading or consumption of the data segment, a credit is sent 84 from the receiver to the sender along the credit link. Commensurate with sending the credit, the credit in sender (CIS) counter is incremented and the credit in receiver (CIR) counter is decremented 86.

Figure 4:
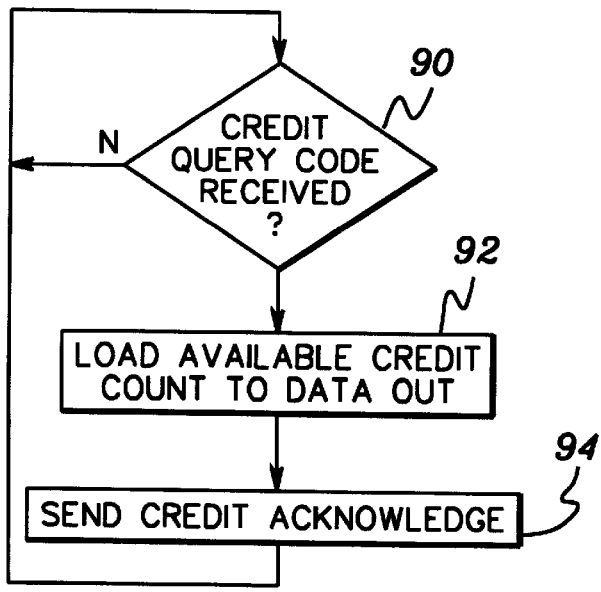
FIG. 4 is a flowchart of one embodiment of credit checking processing in accordance with the present invention implemented at the sender of FIG. 1.

FIG. 4 depicts one embodiment of sender credit checking in accordance with the present invention. Processing within the sender awaits receipt of a credit query code (Q) 90 from the receiver. Once received, the available credit count is loaded onto the data out 92 and sent with a credit acknowledge (A) 94.

Figure 5:
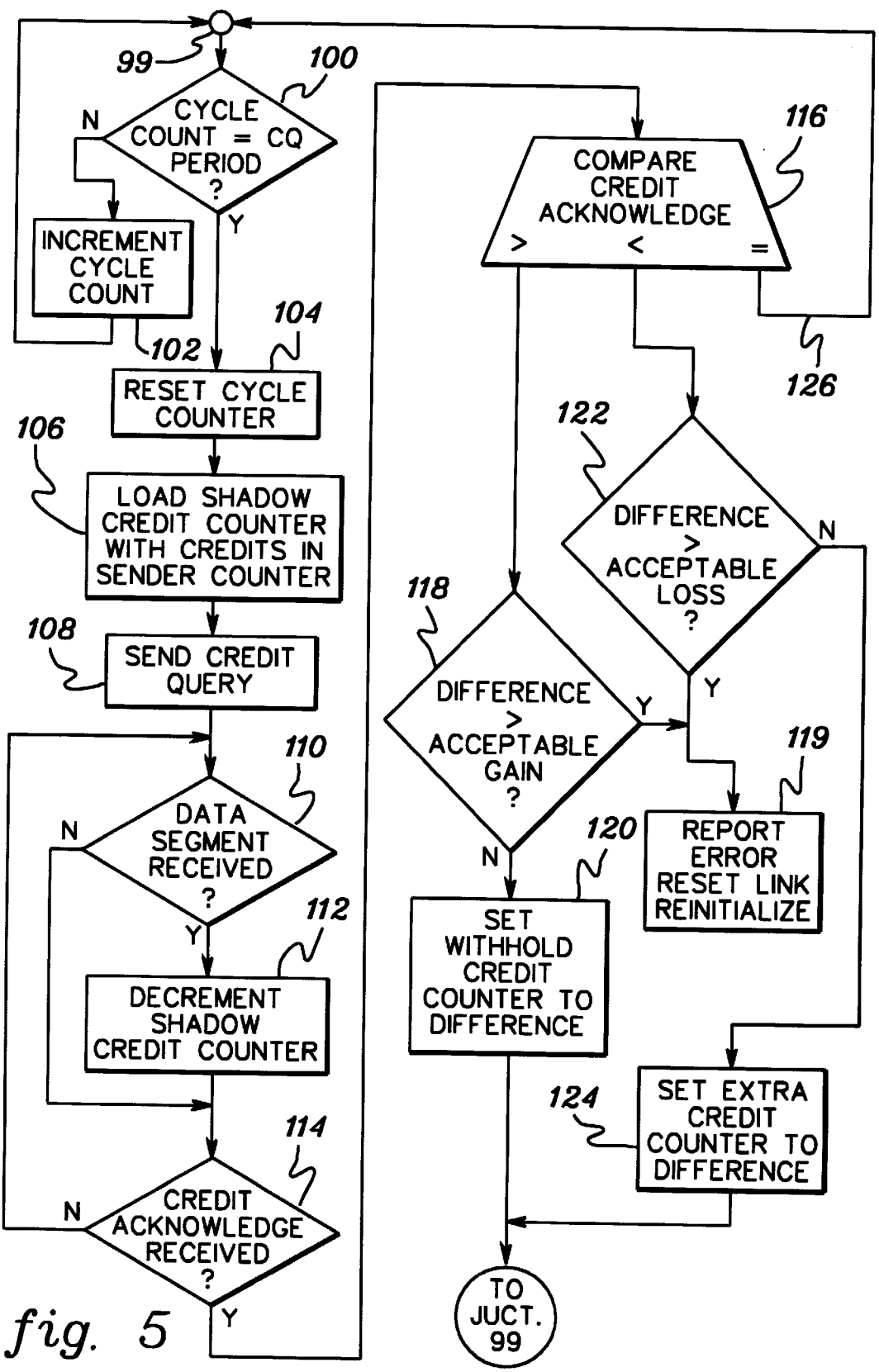
FIG. 5 is a flowchart of one embodiment of credit checking processing in accordance with the present invention implemented in the receiver of FIG. 1.
Figure 6:
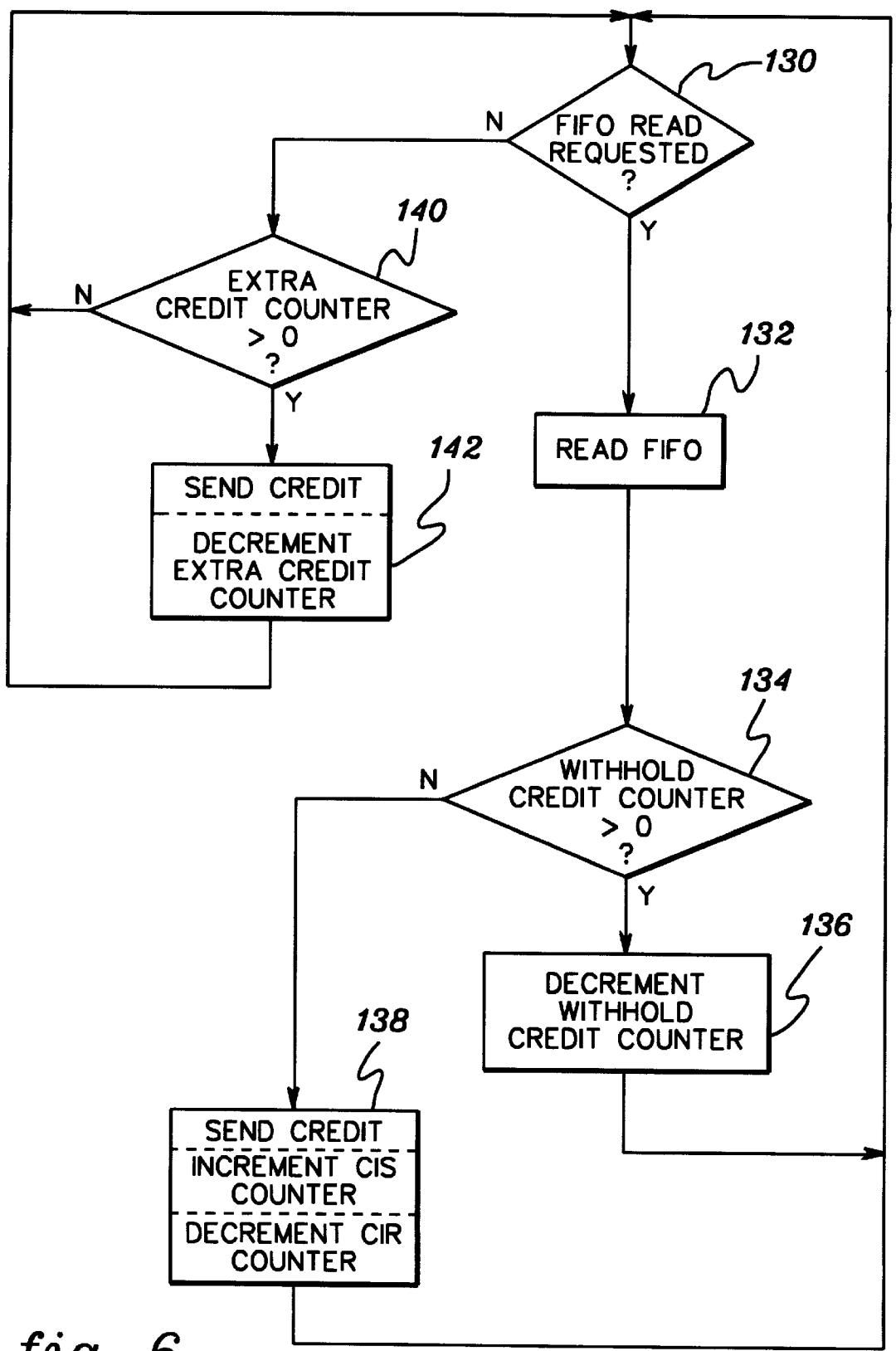
FIG. 6 is a flowchart of an alternate embodiment of the receiver credit processing of FIG. 3b, the alternate embodiment comprising credit correction processing in accordance with the present invention.

FIG. 5 depicts one embodiment of receiver credit checking processing in accordance with this invention. Initially, credit checking waits until the cycle count has reached a predefined cycle query period 100. Assuming that the cycle counter (40) (FIG. 1) has not reached the predefined period, the cycle count is incremented 102 and credit checking processing waits for the next cycle. Once the credit checking period is reached, the cycle counter is reset 104 and the shadow credit counter (42) (FIG. 1) is loaded with the number of credits in the CIS counter (34) (FIG. 1) 106. Simultaneously, the credit query (Q) is sent 108 from the receiver to the sender via the credit link (18) (FIG. 1). After loading the shadow credit counter with the present value of the credits in sender counter, the credit checking processing inquires whether a new data segment is received 110. If "yes" the shadow credit counter is decremented 112 since an additional credit is now accounted for. If the tag bits do not identify a data segment as being received at the receiver, the credit checking processing determines whether a credit acknowledge (A) has been received 114. If "no", processing returns to inquiry 110. Once the credit acknowledge is received, processing compares the received available credit count from the sender with the then current shadow credit count. If the two are equal 126, no credit gain or loss has occurred and processing returns via junction 99 to inquiry 100 to await the next credit query period.

If the available credit count is greater than the shadow credit count then inquiry is made whether this difference is greater than the predefined acceptable credit gain (ACG) 118. If "yes", then an error is recorded, and the communication link is reset or reinitialized 119. Assuming that there is a difference but that the gain is less than the acceptable gain, then the difference is placed into the withhold credit counter 120 for correction as discussed in connection with FIG. 6 and processing returns to junction 99.

If upon comparison a credit loss is determined, processing ascertains whether the difference is greater than the predefined acceptable credit loss (ACL) 122. If "yes", an error is reported and the link is reinitialized 119. Otherwise, the credit loss is placed into the extra credit counter for correction of the number of credits 124 within the communication link as discussed below, and then processing returns to junction 99.

Provided the difference in credits remains within the range defined by the acceptable credit gain (ACG) and the acceptable credit loss (ACL), no action is absolutely necessary. However, for optimal performance, it is preferred that the credit difference be automatically corrected without requiring resetting of the communication link with its commensurate disruption of communications. This is accomplished by the processing of FIG. 6. Initially, the correction processing ascertains whether a data segment has been consumed through receipt of a FIFO read request 130. If "yes", then the data segment is read 132 from the received data FIFO buffer and inquiry is made whether the withhold credit counter value is greater than zero 134. Again, if the withhold credit counter is greater than zero, there has been a credit gain within the closed loop system. In such a case, the withhold credit counter is decremented and no credit is sent from the receiver to the sender 136. If the withhold credit counter is zero, there is no credit gain to be corrected, and a credit is sent from the receiver to the sender, the CIS counter is incremented and the CIR counter is decremented 138. From processings 136 and 138, credit checking returns to inquiry 130 for determining in the next cycle whether a FIFO read request has been received.

If a FIFO read request is not received in a given cycle, then the correction processing determines whether the extra credit counter has a value greater than zero 140. If "yes", a credit is added to the closed loop system and the extra credit counter is decremented 142. By adding a credit to the communication link in a cycle where a data segment is not consumed, correction of credit loss occurs.

To summarize, a hazard exists in credit-based flow control systems due to non-ideal materials in the link. When cables, connectors, board/card wire, etc. are introduced into the data link, the probability of data segments or credits being corrupted increases. As corruption occurs, there will be a corresponding increase or decrease in the number of total credits in the closed link system. An increase in the total number of credits may cause the receive buffer to overflow, resulting in loss of data, while a decrease will eventually degrade performance of the link. Pursuant to the present invention, the total number of credits in the closed link system can be counted to an exact number, regardless of the electrical link between the sender and receiver. Further, the number of preallocated credits in the closed loop system can be selected to accommodate different conditions on different links, for example, different physical link connections. Credit checking pursuant to this invention is nonintrusive since it does not interfere with normal credit and data transmission on the link. There is minimum bandwidth interference because the credit query code is transmitted only during null (idle) times on the credit link. The method could be further enhanced by changing the sender design so that the credit acknowledge code is also only sent during null times. This would require the addition of a credit shadow counter in the sender logic.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A credit-based data communications system employing a specified number of credits, said system comprising:

a sender having an available credit counter;

a receiver having a receive data buffer;

a data link coupling the sender to the receiver for transmission of data segments from the sender to the receive data buffer of the receiver;

means for sending a credit to the available credit counter of the sender upon consumption of a data segment at the receiver, a credit manifesting a portion of memory space in said receive data buffer reserved to store a data segment from the sender;

means for automatically periodically checking nonintrusive to data flow on the data link the number of credits in the system to ascertain whether credit loss or credit gain has occurred from said specified number of credits.

2. A credit-based data communications system employing a specified number of credits, said system comprising:

a sender having an available credit counter;

a receiver having a receive data buffer;

a data link coupling the sender to the receiver for transmission of data segments from the sender to the receive data buffer of the receiver;

means for sending a credit to the available credit counter of the sender upon consumption of a data segment at the receiver, a credit manifesting a portion of memory space in said receive data buffer reserved to store a data segment from the sender;

means for automatically periodically checking the number of credits in the system to ascertain whether credit loss or credit gain has occurred from said specified number of credits, wherein said means for automatically periodically checking comprises:

a shadow credit counter in the receiver;

means for automatically periodically transmitting a credit query from the receiver to the sender and for loading the shadow credit counter with a number of credits not accounted for at the receiver, said number of credits not accounted for comprising the specified number of credits less a number of credits corresponding to unconsumed data segments in the receiver;

means for transmitting a credit acknowledge from the sender to the receiver in response to receipt of the credit query, said credit acknowledge including the number of credits in the available credit counter of the sender;

means for automatically decrementing the shadow credit counter in the receiver with receipt of each data segment from the sender subsequent to transmission of the credit query until the credit acknowledge is received; and means for comparing the number of credits read from the available credit counter of the sender with the shadow credit counter of the receiver for ascertaining any credit loss or credit gain from said specified number of credits.

3. The system of claim 2, wherein said means for automatically periodically checking further comprises means for determining when a credit query is to be sent from the receiver to the sender, said means for determining including a cycle counter at the receiver.

4. The system of claim 1, wherein said sender and said receiver each comprise switch elements in a switch fabric coupling processing nodes of a computer system.

5. The system of claim 1, wherein said means for sending a credit to the available credit counter of the sender comprises a credit link coupling the receiver to the sender.

6. A credit-based data communications system employing a specified number of credits, said system comprising:

a sender having an available credit counter;

a receiver having a receive data buffer;

a data link coupling the sender to the receiver for transmission of data segments from the sender to the receive data buffer of the receiver;

means for sending a credit to the available credit counter of the sender upon consumption of a data segment at the receiver, a credit manifesting a portion of memory space in said receive data buffer reserved to store a data segment from the sender;

means for automatically periodically checking the number of credits in the system to ascertain whether credit loss or credit gain has occurred from said specified number of credits; and wherein said means for automatically periodically checking comprises means for ascertaining a number of credits in the available credit counter of the sender and for comparing available credit count of the sender to a credit in sender count maintained at the receiver, any difference comprising a credit loss or credit gain.

7. A credit-based data communications system employing a specified number of credits, said system comprising:

a sender having an available credit counter;

a receiver having a receive data buffer;

a data link coupling the sender to the receiver for transmission of data segments from the sender to the receive data buffer of the receiver;

means for sending a credit to the available credit counter of the sender upon consumption of a data segment at the receiver, a credit manifesting a portion of memory space in said receive data buffer reserved to store a data segment from the sender;

means for automatically periodically checking the number of credits in the system to ascertain whether credit loss or credit gain has occurred from said specified number of credits; and wherein said means for automatically periodically checking the number of credits in the system comprises means for automatically periodically verifying that the number of credits in the system is within a range defined by a predefined acceptable credit loss from the specified number of credits and a predefined acceptable credit gain from the specified number of credits.

8. The system of claim 7, further comprising means for resetting the system if the credit loss or credit gain exceeds the predefined acceptable credit loss or predefined acceptable credit gain, respectively.

9. The system of claim 7, further comprising means for automatically correcting for credit gain or credit loss within the system to bring the number of credits in the system back to the specified number of credits, wherein said means for automatically correcting is accomplished without resetting the system.

10. The system of claim 9, further comprising:

means for storing credit loss in an extra credit counter at the receiver, and means for storing credit gain in a withhold credit counter at the receiver;

wherein if the receiver does not consume a data segment in a cycle, said means for automatically correcting for credit loss comprises means for determining whether value of the extra credit counter is greater than zero, and if so, for decrementing the extra credit counter and sending a credit from the receiver to the sender; and wherein if the receiver does consume a data segment in a cycle, said system further comprises means for determining whether value of the withhold credit counter is greater than zero, and if so, for decrementing the withhold credit counter and blocking return of a credit from the receiver to the available credit counter of the sender.

* * * * *